US011429519B2

United States Patent
Li

(10) Patent No.: US 11,429,519 B2
(45) Date of Patent: Aug. 30, 2022

(54) SYSTEM AND METHOD FOR FACILITATING REDUCTION OF LATENCY AND MITIGATION OF WRITE AMPLIFICATION IN A MULTI-TENANCY STORAGE DRIVE

(71) Applicant: Alibaba Group Holding Limited, Grand Cayman (KY)

(72) Inventor: Shu Li, Bothell, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 38 days.

(21) Appl. No.: 16/725,038

(22) Filed: Dec. 23, 2019

(65) Prior Publication Data

US 2021/0191851 A1 Jun. 24, 2021

(51) Int. Cl.
*G06F 12/02* (2006.01)
*G06F 12/0882* (2016.01)
(Continued)

(52) U.S. Cl.
CPC ........ *G06F 12/0246* (2013.01); *G06F 9/5016* (2013.01); *G06F 9/544* (2013.01);
(Continued)

(58) Field of Classification Search
None
See application file for complete search history.

(56) References Cited

U.S. PATENT DOCUMENTS

| 5,307,410 A | 4/1994 | Bennett |
| 5,675,648 A | 10/1997 | Townsend |

(Continued)

FOREIGN PATENT DOCUMENTS

| CN | 104662599 | 5/2015 |
| CN | 106375840 | 2/2017 |

(Continued)

OTHER PUBLICATIONS

Kim et al. "A Space-Efficient Flash Translation Layer for CompactFlash Systems." May 2002. IEEE. IEEE Transactions on Consumer Electronics. vol. 48. pp. 366-375.*

(Continued)

*Primary Examiner* — Nathan Sadler
(74) *Attorney, Agent, or Firm* — Shun Yao; Yao Legal Services, Inc.

(57) ABSTRACT

During operation, the system receives a chunk of data to be written to a non-volatile memory, wherein the chunk includes a plurality of sectors. The system assigns consecutive logical block addresses (LBAs) to the plurality of sectors. In response to determining that a first sector is associated with an existing stream for the chunk, the system appends the first sector to one or more other sectors stored in a first buffer associated with the existing stream. The system detects that a total size of the stored sectors in the first buffer is the same as a first size of a physical page in the non-volatile memory. The system writes the stored sectors from the first buffer to the non-volatile memory at a first physical page address. The system creates, in a data structure, a first entry which maps the LBAs of the written sectors to the first physical page address.

20 Claims, 10 Drawing Sheets

(51) Int. Cl.
  *G06F 12/1045* (2016.01)
  *G06F 9/50* (2006.01)
  *G06F 11/30* (2006.01)
  *G06F 9/54* (2006.01)

(52) U.S. Cl.
  CPC ...... *G06F 11/3037* (2013.01); *G06F 12/0882* (2013.01); *G06F 12/1054* (2013.01); *G06F 2209/5011* (2013.01); *G06F 2212/7201* (2013.01); *G06F 2212/7203* (2013.01)

(56) References Cited

U.S. PATENT DOCUMENTS

| | | |
|---|---|---|
| 6,505,247 B1 | 1/2003 | Steger |
| 8,041,335 B2 | 10/2011 | Khetawat |
| 8,266,433 B1 | 9/2012 | Przykucki |
| 8,990,550 B1 | 3/2015 | Hushon |
| 9,077,577 B1 | 7/2015 | Ashrafi |
| 9,130,742 B2 | 9/2015 | Yao |
| 9,294,267 B2 | 3/2016 | Kamath |
| 9,323,901 B1 | 4/2016 | Nair |
| 9,698,979 B2 | 7/2017 | Armstrong |
| 9,830,467 B1 | 11/2017 | Harold |
| 9,887,976 B2 | 2/2018 | Hughes |
| 2001/0023416 A1 | 9/2001 | Hosokawa |
| 2005/0071632 A1 | 3/2005 | Pauker |
| 2005/0071677 A1 | 3/2005 | Khanna |
| 2005/0135620 A1 | 6/2005 | Kastella |
| 2005/0144440 A1 | 6/2005 | Catherman |
| 2005/0144484 A1 | 6/2005 | Wakayama |
| 2005/0259825 A1 | 11/2005 | Trifonov |
| 2006/0026693 A1 | 2/2006 | Bade |
| 2006/0056630 A1 | 3/2006 | Zimmer |
| 2006/0101266 A1 | 5/2006 | Klassen |
| 2006/0155922 A1* | 7/2006 | Gorobets ............ G06F 12/0246 711/103 |
| 2007/0016794 A1 | 1/2007 | Harrison |
| 2007/0076889 A1 | 4/2007 | DeRobertis |
| 2007/0147292 A1 | 6/2007 | Van Ewijk |
| 2007/0192598 A1 | 8/2007 | Troxel |
| 2008/0065881 A1 | 3/2008 | Dawson |
| 2008/0114983 A1 | 5/2008 | Sherkin |
| 2008/0123859 A1 | 5/2008 | Mamidwar |
| 2008/0165973 A1 | 7/2008 | Miranda Gavillan |
| 2008/0219449 A1 | 9/2008 | Ball |
| 2008/0222734 A1 | 9/2008 | Redlich |
| 2009/0019285 A1 | 1/2009 | Chen |
| 2009/0034733 A1 | 2/2009 | Raman |
| 2009/0055892 A1 | 2/2009 | Lu |
| 2009/0092252 A1 | 4/2009 | Noll |
| 2009/0106551 A1 | 4/2009 | Boren |
| 2009/0125444 A1 | 5/2009 | Cochran |
| 2009/0147958 A1 | 6/2009 | Calcaterra |
| 2009/0193184 A1 | 7/2009 | Yu |
| 2009/0204812 A1 | 8/2009 | Baker |
| 2009/0262942 A1 | 10/2009 | Maeda |
| 2009/0271634 A1 | 10/2009 | Boult |
| 2010/0132015 A1 | 5/2010 | Lee |
| 2010/0169953 A1 | 7/2010 | Hofer |
| 2010/0199336 A1 | 8/2010 | Tan |
| 2010/0211787 A1 | 8/2010 | Bukshpun |
| 2010/0265077 A1 | 10/2010 | Humble |
| 2010/0277435 A1 | 11/2010 | Han |
| 2010/0281254 A1 | 11/2010 | Carro |
| 2010/0299526 A1 | 11/2010 | Wiseman |
| 2011/0069972 A1 | 3/2011 | Wiseman |
| 2011/0099367 A1 | 4/2011 | Thom |
| 2011/0126011 A1 | 5/2011 | Choi |
| 2011/0167503 A1 | 7/2011 | Horal |
| 2011/0209202 A1 | 8/2011 | Otranen |
| 2011/0213979 A1 | 9/2011 | Wiseman |
| 2011/0231615 A1 | 9/2011 | Ober |
| 2011/0302408 A1 | 12/2011 | Mcdermott |
| 2012/0032781 A1 | 2/2012 | Moon |
| 2012/0045002 A1 | 2/2012 | Zivkovic |
| 2012/0084570 A1 | 4/2012 | Kuzin |
| 2012/0087500 A1 | 4/2012 | Ukita |
| 2012/0166993 A1 | 6/2012 | Anderson |
| 2012/0177201 A1 | 7/2012 | Ayling |
| 2012/0210408 A1 | 8/2012 | Lu |
| 2012/0250863 A1 | 10/2012 | Bukshpun |
| 2012/0265892 A1 | 10/2012 | Ma |
| 2013/0083926 A1 | 4/2013 | Hughes |
| 2013/0101119 A1 | 4/2013 | Nordholt |
| 2013/0138875 A1* | 5/2013 | Kamphenkel ....... G06F 12/0246 711/103 |
| 2013/0142336 A1 | 6/2013 | Fries |
| 2013/0159704 A1 | 6/2013 | Chandrasekaran |
| 2013/0208894 A1 | 8/2013 | Bovino |
| 2013/0219454 A1 | 8/2013 | Hewinson |
| 2013/0227286 A1 | 8/2013 | Brisson |
| 2013/0246641 A1 | 9/2013 | Vimpari |
| 2013/0251145 A1 | 9/2013 | Lowans |
| 2013/0259233 A1 | 10/2013 | Baba |
| 2013/0262873 A1 | 10/2013 | Read |
| 2013/0267204 A1 | 10/2013 | Schultz |
| 2013/0308506 A1 | 11/2013 | Kim |
| 2013/0311707 A1* | 11/2013 | Kawamura ......... G06F 12/0246 711/103 |
| 2013/0315395 A1 | 11/2013 | Jacobs |
| 2014/0068765 A1 | 3/2014 | Choi |
| 2014/0104137 A1 | 4/2014 | Brown |
| 2014/0141725 A1 | 5/2014 | Jesme |
| 2014/0173713 A1 | 6/2014 | Zheng |
| 2014/0237565 A1 | 8/2014 | Fleysher |
| 2014/0259138 A1 | 9/2014 | Fu |
| 2014/0281500 A1 | 9/2014 | Ignatchenko |
| 2014/0281511 A1 | 9/2014 | Kaushik |
| 2014/0281548 A1 | 9/2014 | Boyer |
| 2014/0331050 A1 | 11/2014 | Armstrong |
| 2014/0351915 A1 | 11/2014 | Otranen |
| 2015/0046709 A1 | 2/2015 | Anspach |
| 2015/0062904 A1 | 3/2015 | Sanga |
| 2015/0074337 A1* | 3/2015 | Jo ........................ G06F 3/0679 711/103 |
| 2015/0089624 A1 | 3/2015 | Kim |
| 2015/0095987 A1 | 4/2015 | Potash |
| 2015/0134727 A1 | 5/2015 | Lee |
| 2015/0134947 A1 | 5/2015 | Varcoe |
| 2015/0181308 A1 | 6/2015 | Ducharme |
| 2015/0193338 A1* | 7/2015 | Sundaram ............ G06F 3/0659 711/103 |
| 2015/0207926 A1 | 7/2015 | Brown |
| 2015/0222619 A1 | 8/2015 | Hughes |
| 2015/0236852 A1 | 8/2015 | Tanizawa |
| 2015/0263855 A1 | 9/2015 | Schulz |
| 2015/0270963 A1 | 9/2015 | Tanizawa |
| 2015/0271147 A1 | 9/2015 | Tanizawa |
| 2015/0288517 A1 | 10/2015 | Evans |
| 2015/0288542 A1 | 10/2015 | Ashrafi |
| 2015/0309924 A1 | 10/2015 | Chen |
| 2015/0317469 A1 | 11/2015 | Liu |
| 2015/0325242 A1 | 11/2015 | Lu |
| 2015/0326613 A1 | 11/2015 | Devarajan |
| 2015/0350181 A1 | 12/2015 | Call |
| 2015/0379261 A1 | 12/2015 | Daigle |
| 2015/0381363 A1 | 12/2015 | Teixeira |
| 2016/0013937 A1 | 1/2016 | Choi |
| 2016/0021068 A1 | 1/2016 | Jueneman |
| 2016/0080708 A1 | 3/2016 | Urata |
| 2016/0087946 A1 | 3/2016 | Yang |
| 2016/0087950 A1 | 3/2016 | Barbir |
| 2016/0105439 A1 | 4/2016 | Hunt |
| 2016/0127127 A1 | 5/2016 | Zhao |
| 2016/0149700 A1 | 5/2016 | Fu |
| 2016/0210105 A1 | 7/2016 | Ru |
| 2016/0226846 A1 | 8/2016 | Fu |
| 2016/0241396 A1 | 8/2016 | Fu |
| 2016/0248581 A1 | 8/2016 | Fu |
| 2016/0283116 A1* | 9/2016 | Ramalingam ......... G06F 3/0611 |
| 2016/0283125 A1* | 9/2016 | Hashimoto ........... G06F 16/166 |
| 2016/0294783 A1 | 10/2016 | Piqueras Jover |
| 2016/0306552 A1* | 10/2016 | Liu ....................... G06F 3/0679 |
| 2016/0313943 A1* | 10/2016 | Hashimoto ............ G06F 3/061 |

(56) References Cited

U.S. PATENT DOCUMENTS

| | | |
|---|---|---|
| 2016/0337329 A1 | 11/2016 | Sood |
| 2016/0357452 A1 | 12/2016 | Kadam |
| 2016/0359839 A1 | 12/2016 | Natividad |
| 2016/0366713 A1 | 12/2016 | Sonnino |
| 2017/0034167 A1 | 2/2017 | Figueira |
| 2017/0104588 A1 | 4/2017 | Camenisch |
| 2017/0214525 A1 | 7/2017 | Zhao |
| 2017/0230173 A1 | 8/2017 | Choi |
| 2017/0302448 A1 | 10/2017 | Luk |
| 2017/0324730 A1 | 11/2017 | Otranen |
| 2017/0371585 A1* | 12/2017 | Lazo .................. G06F 3/0659 |
| 2018/0048466 A1 | 2/2018 | Chen |
| 2018/0063709 A1 | 3/2018 | Morrison |
| 2018/0077449 A1 | 3/2018 | Herz |
| 2018/0262907 A1 | 9/2018 | Alanis |
| 2018/0351734 A1 | 12/2018 | Zhao |
| 2019/0103962 A1 | 4/2019 | Howe |
| 2019/0179751 A1* | 6/2019 | Kanno ................ G06F 12/0804 |
| 2019/0391756 A1* | 12/2019 | Wang .................... G06F 3/068 |
| 2020/0201570 A1* | 6/2020 | Kim .................... G06F 12/0238 |

FOREIGN PATENT DOCUMENTS

| | | |
|---|---|---|
| EP | 0962070 | 12/1999 |
| EP | 2385690 | 11/2011 |
| EP | 3007478 | 4/2016 |
| WO | 2012098543 | 7/2012 |
| WO | 2013026086 | 2/2013 |
| WO | 2016070141 | 5/2016 |

OTHER PUBLICATIONS

Kang et al. "The Multi-streamed Solid-State Drive." Jun. 2014. USENIX. HotStorage '14.*

Bhimani et al. "FIOS: Feature Based I/O Stream Identification for Improving Endurance of Multi-Stream SSDs." Jul. 2018. IEEE. 11th International Conference on Cloud Computing. pp. 17-24.*

Intel. "Understanding the Flash Translation Layer (FTL) Specification." Dec. 1998. Application Note AP-684.*

Tien-Sheng Lin, et al., Quantulm Aulthentication and Secure Communication Protocols, 2006 IEEE (Year:2006).

Charles H. Bennett et al., Quantum cryptography: Public key distribution and coin tossing, www.elsevier.com/locate/tcx, 2014 (Year: 2014).

R. Alleaume et al., Using Quantum key distribution for cryptographic purposes: A survey, www.elsevier.com/locate/tcs, 2009 (Year:2009).

Toung-Shang Wei et al., Comment on "Quantum Key Distribution and Quantum Authentication Based on Entangled State", Springer, 2011 (Year: 2011).

Ivan Damgard et al., Secure Identification and QKD in the bounded-quantum-storage model, www.elsevier.com/locate/tcs, 2009 (Year: 2009).

Valerio Scarani et al., The black paper of quantum cryptography: Real implementation problems, www.elsevier.com/locate/tcs, 2014.

Jung-Lun Hsu et al., Dynamic quantum secret sharing, Springer, 2012.

Ci-Hong Liao et al., Dynamic quantum secret sharing protocol based on GHZ state, Springer, 2014.

Xugang Ren et al., A Novel Dynamic User Authentication Scheme, 2012 International Symposium on Communications and Information Technologies, 2012.

Phyllis A. Schneck et al., Dynamic Authentication for High-Performance Networked Applications, 1998 IEEE.

Lanjun Dang, An Improved Mutual Authentication Scheme for Smart Card Secure Messaging, Proceedings of the IEEE International Conference on E-Commerce Technology for Dynamic E-Business (CEC-East'04), 2004.

Wenjie Liu, et al., Authenticated Quantum Secure Direct Communication with Qutrits, Fourth International Conference on Natural Computation, IEEE 2008.

Mark Hillery et al. "Quantum Secret Sharing", American Physical Society 1999.

J G Rarity et al. "Ground to satellite secure key exchange using quantum cryptography", New Journal of Physics 2002.

Richard J Hughes et al. "Practical free-space quantum key distribution over 10 km in daylight and at night", New Journal of Physics 2002.

Baker et al. "Recommendation for Key Management—Part 1: General (Revision 3)", NIST Special Publication 800-57, Jul. 2012 (Year:2012).

Sufyan T. Faraj, "A Novel Extension of SSL/TLS Based on Quantum Key Distribution", Computer and Communication Engineering , 2008. ICCCE 2008. International Conference on, IEEE, Piscataway, NJ, USA, May 16, 2008, pp. 919-922.

* cited by examiner

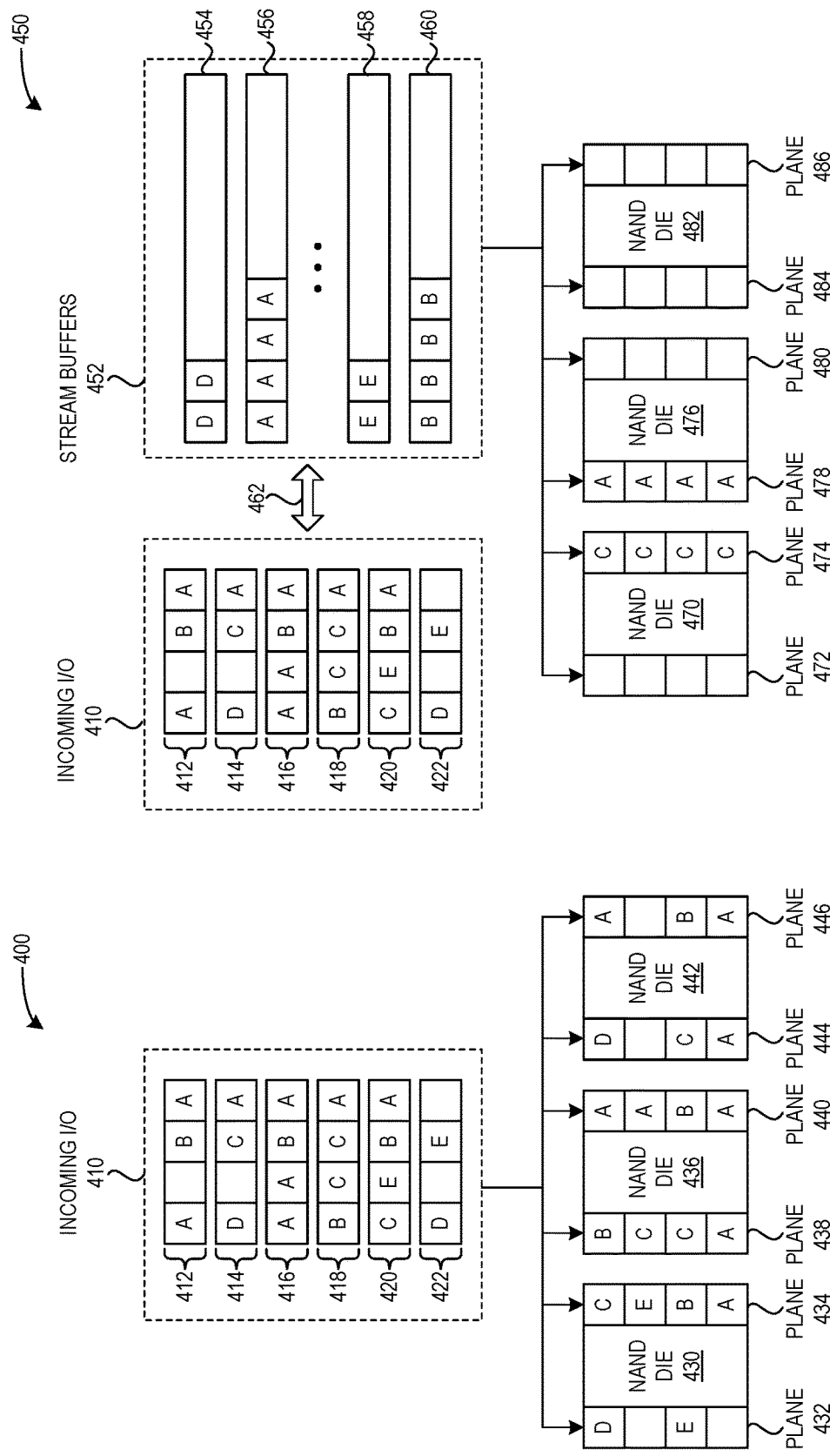

SYSTEM AND METHOD FOR FACILITATING REDUCTION OF LATENCY AND MITIGATION OF WRITE AMPLIFICATION IN A MULTI-TENANCY STORAGE DRIVE

BACKGROUND

Field

This disclosure is generally related to the field of data storage. More specifically, this disclosure is related to a system and method for facilitating reduction of latency and mitigation of write amplification in a multi-tenancy storage drive.

Related Art

Today, various storage systems are being used to store and access the ever-increasing amount of digital content. A storage system can include storage servers with one or more storage devices, and a storage device can include physical storage media with a non-volatile memory (such as a solid state drive (SSD) or a hard disk drive (HDD)). A storage system can serve thousands of applications, and input/output (I/O) requests may be received by a respective storage drive from tens of different applications. In such a "multi-tenancy" scenario, a single storage drive may serve many different applications. The performance of each storage drive in a multi-tenancy scenario is thus critical in order to sustain and grow the hyperscale infrastructure.

One current method for data placement in a multi-tenant storage system involves treating all incoming I/O requests evenly to avoid I/O starvation. However, this method can result in a significant write amplification, as described below in relation to FIG. 1. Furthermore, the I/O requests received by a single drive at any given moment can be mixed (e.g., can involve multiple differing features). The mixed I/O requests can form a large number of combinations which are difficult to predict and, consequently, difficult to optimize in advance. Thus, it can be challenging to provide optimization on all I/O requests without sacrificing on performance for a few. As the number of applications being served continues to increase, the performance of each drive in a multi-tenancy scenario can become more critical to support the development of the storage infrastructure.

SUMMARY

One embodiment provides a system and method for facilitating data placement. During operation, the system receives a chunk of data to be written to a non-volatile memory, wherein the chunk includes a plurality of sectors, and wherein the plurality of sectors are assigned with consecutive logical block addresses. The system writes the sectors from a first buffer to the non-volatile memory at a first physical page address. The system creates, in a data structure, a first entry which maps the logical block addresses of the written sectors to the first physical page address.

In some embodiments, prior to writing the sectors from the first buffer to the non-volatile memory, in response to determining that a first sector is associated with an existing stream for the chunk, the system appends the first sector to one or more other sectors stored in the first buffer, wherein the first buffer is associated with the existing stream. Writing the sectors from the first buffer to the non-volatile memory comprises, in response to detecting that a total size of the stored sectors in the first buffer is the same as a first size of a physical page in the non-volatile memory, writing the stored sectors from the first buffer to the non-volatile memory.

In some embodiments, the system marks as available a space in the first buffer corresponding to the written sectors. The first buffer can be stored in a volatile cache or a non-volatile memory.

In some embodiments, in response to appending the first sector to one or more other sectors stored in the first buffer, the system generates an acknowledgment of a write commit for an application from which the chunk of data is received.

In some embodiments, in response to determining that a second sector is not associated with an existing stream for the chunk, and in response to successfully allocating a second buffer associated with a new stream, the system writes the second sector to the second buffer. In response to unsuccessfully allocating the second buffer, the system successfully obtains a reserved buffer from a reserved pool of buffers and writes the second sector to the reserved buffer.

In some embodiments, in response to unsuccessfully allocating the second buffer, the system performs the following operations: unsuccessfully obtains a reserved buffer from a reserved pool of buffers; identifies a third buffer with sectors of a total size less than the first size; appends dummy data to the third buffer to obtain third data of the first size; writes the third data from the third buffer to the non-volatile memory at a second physical page address; marks as available a space in the third buffer corresponding to the third data; creates, in the data structure, a second entry which maps logical block addresses of sectors of the third data to the second physical page address; allocates the third buffer as the new buffer; and writes the second sector to the third buffer.

In some embodiments, the chunk comprises a plurality of logical extents and is associated with a unique application. A respective logical extent comprises a plurality of logical pages. A respective logical page comprises one or more sectors with consecutive logical block addresses. A logical block address corresponds to a sector of the chunk.

In some embodiments, the non-volatile memory comprises a NAND-based flash memory, the respective logical page is a NAND logical page, and the first physical page address corresponds to a NAND physical page.

In some embodiments, the data structure is stored in the volatile cache and the non-volatile memory, and the first entry indicates the logical addresses of the written sectors based on the two least significant bits.

BRIEF DESCRIPTION OF THE FIGURES

FIG. 4A illustrates an exemplary environment which facilitates data placement, including mixed I/O data, in accordance with the prior art.

FIG. 4B illustrates an exemplary environment which facilitates data placement, including stream buffers which reshuffle and hold data from a same chunk or application, and writing the reshuffled data to the non-volatile memory, in accordance with an embodiment of the present application.

In the figures, like reference numerals refer to the same figure elements.

DETAILED DESCRIPTION

Figure 1:
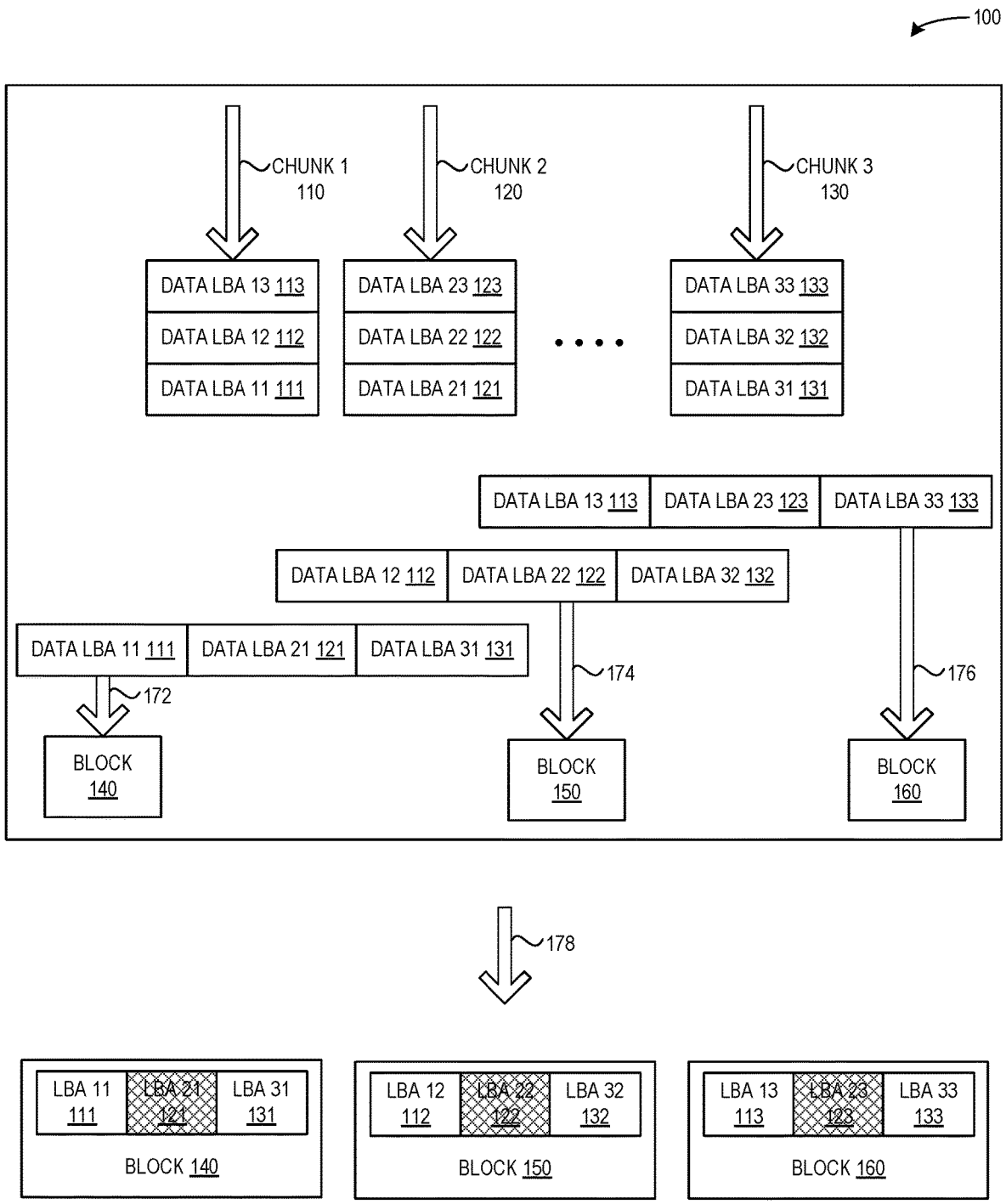
FIG. 1 illustrates an exemplary environment for facilitating data placement in a multi-tenant storage system, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein facilitate an improved storage system which decreases the latency and mitigates the write amplification of I/O requests in a multi-tenant storage system by: assigning consecutive LBAs to sectors in large logical extents of a chunk of data; maintaining a simplified mapping table which uses a smaller amount of memory; and using stream buffers which reshuffle and group data into sizes corresponding to the size of a unit in the physical storage media.

As described above, a storage system can serve thousands of applications, and input/output (I/O) requests may be received by a respective storage drive from tens of different applications. Because a single storage drive may serve many different applications, the performance of each storage drive in such a multi-tenancy scenario is critical in order to sustain and grow the hyperscale infrastructure.

The I/O requests received by a single drive at any given moment can be mixed. The mixed I/O requests can form a large number of combinations which are difficult to predict and, consequently, difficult to optimize in advance. Furthermore, the mixed I/O requests can involve multiple differing features, e.g.: read or write requests of different sizes, priorities, and types (sequential/random); I/O request which require different amounts of bandwidth, processing, and storage; and applications of different priorities sending mixed requests at differing frequencies and intervals. Thus, it can be challenging to provide optimization on all I/O requests without sacrificing performance for a few. As the number of applications being served continues to increase, the performance of each drive in a multi-tenancy scenario can become more critical to support the development of the storage infrastructure.

One current method for data placement in a multi-tenancy storage system involves treating all incoming I/O requests evenly to avoid I/O starvation. To ensure that the I/Os from all applications can be served to sufficiently satisfy the service level agreements (SLAs), the system can mark a respective I/O request with the corresponding application identifier. This allows a respective storage drive to select an I/O evenly (e.g., based on an equal chance), which can result in consolidating I/O requests from the multiple "tenants" (i.e., applications). However, this method can result in a significant write amplification, as out-of-date sectors can create "holes" in the physical pages. Subsequently, when the physical pages with holes are to be recycled, valid sectors (surrounding the holes or in the same physical page to be recycled) must be copied out and re-programmed. This can lead to a significant write amplification, as described below in relation to FIG. 1.

The embodiments described herein address these challenges by providing a system which merges I/O requests from a large number of applications into chunks, which are then written to the storage drives. The system can divide a data chunk into a plurality of logical extents, where a logical extent can include consecutive logical block addresses (LBAs). A logical extent can include a plurality of logical pages, and a logical page can include sectors with consecutive LBAs. The size of a logical page can match the physical access granularity of current physical storage media, such as NAND flash, as described below in relation to FIG. 1.

Using a logical page which matches the size of a physical page in NAND flash allows the system to maintain a simplified mapping table, which uses a smaller amount of memory and can also provide a faster query latency, as described below in relation to FIGS. 3A and 3B. Furthermore, the system can use stream buffers, where a respective stream buffer can correspond to an application or chunk (e.g., based on an application identifier or a chunk identifier). The system can reshuffle incoming I/O sectors (from various applications or chunks), and group the sectors into a corresponding stream buffer. When the buffer includes a sufficient amount of data (e.g., a sufficient number of sectors) to fill a physical NAND page, the system can write the grouped data to a physical page of the NAND flash, as described below in relation to FIG. 4. Allocating and organizing stream buffers is described below in relation to FIG. 5.

Thus, the embodiments described herein can provide a reduced latency, both in accessing the mapping table and the data stored in like groups in physical pages of the storage media. The system can mitigate the write amplification by using stream buffers which hold and organize the sectors based on their application or chunk identifiers, and by writing the data in like groups of a size which matches a physical unit in the NAND flash (e.g., to a physical NAND page). These improvements can result in a multi-tenant storage system with increased efficiency and performance.

A "distributed storage system" can include multiple storage servers. A "storage server" or a "storage system" refers to a computing device which can include multiple storage devices or storage drives. A "storage device" or a "storage drive" refers to a device or a drive with a non-volatile memory which can provide persistent storage of data, e.g., a solid state drive (SSD) or a hard disk drive (HDD).

The terms "multi-tenant storage system" and "multi-tenancy storage system" refer to a scenario in which a single system serves multiple customers or "tenants." One example is a single storage drive which serves multiple applications, customers, or users.

The term "simplified mapping table" refers to a mapping table which has a shorter depth and width than a conventional mapping table.

The terms "logical page" and "logical NAND page" refer to a unit of data whose size matches a physical access granularity of NAND flash, e.g., of a physical NAND page.

The terms "NAND page address" and "NPA" refer to a physical address or location of a page in the storage media of physical NAND flash.

The term "I/O starvation" refers to an imbalance among I/O requests from multiple applications. Some applications may have I/O requests which require a longer latency that may violate a service level agreement (SLA).

Exemplary Data Placement in a Multi-Tenant Storage System in the Prior Art

As described above, one current method for data placement in a multi-tenant storage system involves treating all incoming I/O requests evenly to avoid I/O starvation. To ensure that the I/Os from all applications can be served to sufficiently satisfy the service level agreements (SLAs), the system can mark a respective I/O request with the corresponding application identifier. This allows a respective storage drive to select an I/O evenly or equally (e.g., based on an equal chance), which can result in consolidating I/O requests from the multiple tenants or applications. However, this method can result in a significant write amplification, as out-of-date sectors can create holes in the physical pages. Subsequently, when the physical pages with holes are to be recycled, valid sectors in the physical pages to be recycled must be copied out and re-programmed. This can lead to a significant write amplification, as described below in relation to FIG. 1.

FIG. 1 illustrates an exemplary environment 100 for facilitating data placement in a multi-tenant storage system, in accordance with the prior art. In environment 100, various data chunks are received by a storage device, where each chunk can correspond to a different application or "tenant." Each chunk can be identified based on a chunk identifier or an application identifier. The system of environment 100 treats all incoming I/O evenly or equally to avoid I/O starvation. A chunk 1 110 can include data LBA 11 111, data LBA 12 112, and data LBA 13 113; a chunk 2 120 can include data LBA 121, data LBA 22 122, and data LBA 23 123. A chunk 3 130 can include data LBA 31 131, data LBA 32 132, and data LBA 33 133. In treating all this incoming I/O evenly, the system can place portions of each chunk into different blocks of the storage device.

For example, the following three portions of data can be written to or placed into a block 140 (via a communication 172): data LBA 11 111 from chunk 1 110; data LBA 21 121 from chunk 2 120; and data LBA 31 131 from chunk 3 130. Similarly, the following three portions of data can be written to or placed into a block 150 (via a communication 174): data LBA 12 112 from chunk 1 110; data LBA 22 122 from chunk 2 120; and data LBA 32 132 from chunk 3 130. Similarly, the following three portions of data can be written to or placed into a block 160 (via a communication 176): data LBA 13 113 from chunk 1 110; data LBA 23 123 from chunk 2 120; and data LBA 33 133 from chunk 3 130.

The system of environment 100 can gather sectors of data from different applications (shown as portions of different chunks) to form a physical page which is the same a NAND program unit. While this can achieve execution of a write command, it can also lead to a significant write amplification, which can affect the performance of the storage drive.

When the system updates existing (stored) data, certain stored portions (which are spread across multiple blocks) may be marked as invalid. This can create holes in the physical pages. Subsequently, when the system performs a garbage collection or recycling process, the system must copy out the valid data from the units which hold the invalid data (e.g., the holes) to release the capacity in order to accommodate incoming sectors. For example, when an update 178 occurs related to chunk 2 120, the system can mark the following three blocks as invalid: LBA 21 121 in block 140; LBA 22 122 in block 150; and LBA 23 123 in block 160. During a subsequent garbage collection or recycling process, the system must copy out the valid sectors from those blocks (e.g.: LBA 11 111 and LBA 31 131 from block 140; LBA 12 112 and LBA 32 132 from block 150; and LBA 13 113 and LBA 33 133 from block 160) in order to allow the storage media to be re-programmed. This write amplification can result in a decreased performance, as the increase of program/erase cycles can result in a reduced lifespan and also consume the overall bandwidth for handling an I/O request (e.g., a NAND read/write operation).

Using Logical Extents and Logical Pages to Facilitate Data Placement

Figure 2:
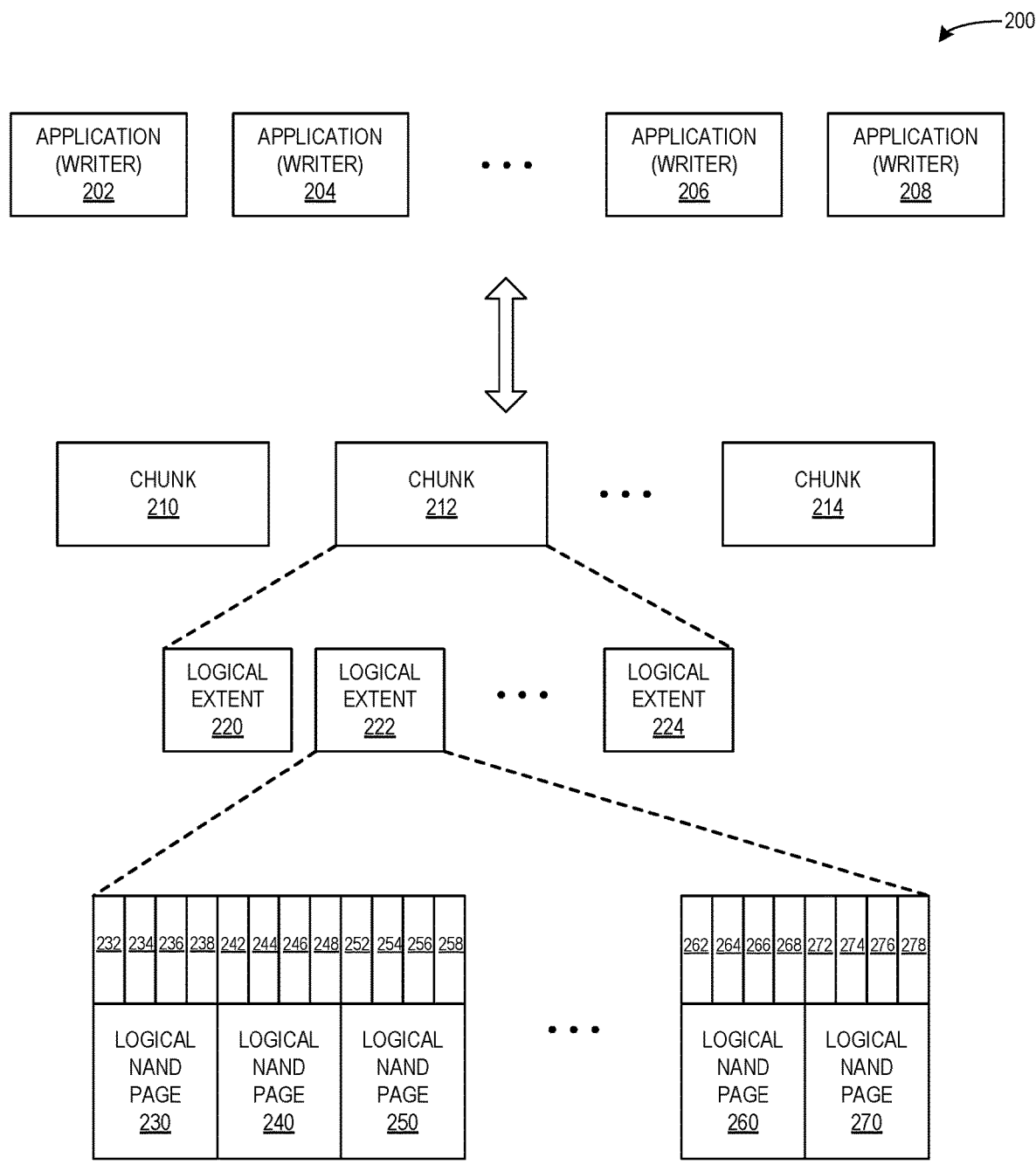
FIG. 2 illustrates an exemplary environment which facilitates data placement, using logical extents and logical pages with consecutive LBAs, in accordance with an embodiment of the present application.

FIG. 2 illustrates an exemplary environment 200 which facilitates data placement, using logical extents and logical pages with consecutive LBAs, in accordance with an embodiment of the present application. Environment 200 can include multiple applications (writers), such as 202, 204, 206, and 208. Data from an application can be received by a storage system or device as a chunk, e.g., as a chunk 210, 212, and 214. Each chunk can include multiple logical extents (e.g., 220, 222, and 224) using a relatively large logical space (e.g., 1 MB) with consecutively assigned logical block addresses (LBAs). Each logical extent can include a plurality of logical NAND pages, where a logical page can include one or more sectors with consecutive LBAs. Each logical page can match the physical access granularity of current NAND flash. That is, the total size of all the sectors in a logical page can be the same as the size of a physical unit in the storage media (e.g., a physical page).

For example, logical extent 222 can include logical NAND pages 230, 240, 250, 260, and 270, where each logical NAND page can include four 4 KB sectors with consecutive LBAs. For example: logical NAND page 230 can include LBAs 232, 234, 236, and 238; logical NAND page 240 can include LBAs 242, 244, 246, and 248; logical NAND page 250 can include LBAs 252, 254, 256, and 258; logical NAND page 260 can include LBAs 262, 264, 266, and 268; and logical NAND page 270 can include LBAs 272, 274, 276, and 278. Using these logical NAND pages can also result in an optimization for the flash translation layer (FTL) which can reduce the amount of memory used, as described below in relation to FIG. 3.

Exemplary Mapping Table: Prior Art Vs. One Embodiment

Figures 3A, 3B:
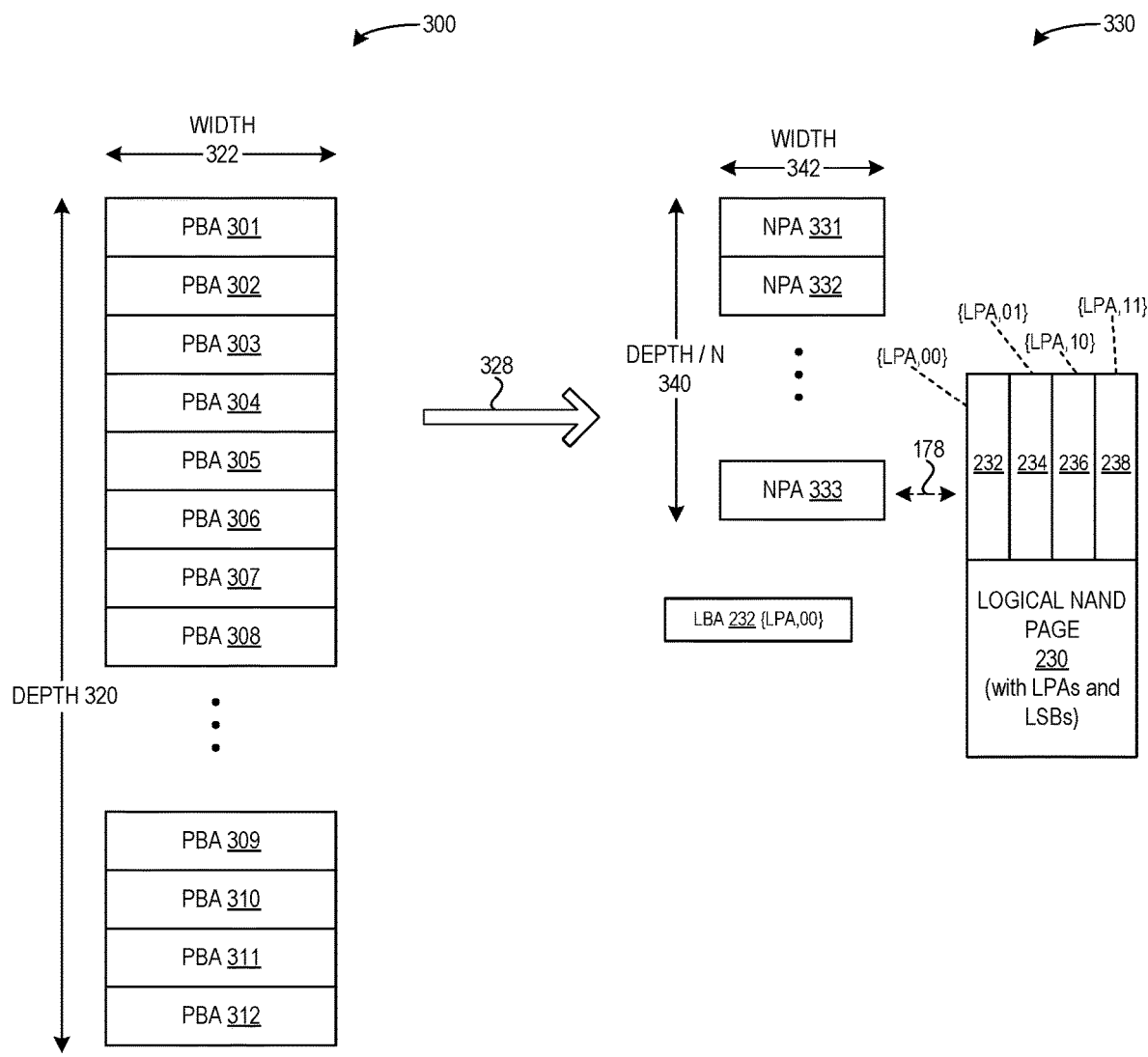
FIG. 3A illustrates an exemplary mapping table, in accordance with the prior art.
FIG. 3B illustrates an exemplary mapping table, with a reduced size and query latency as compared to the mapping table of FIG. 3A, in accordance with an embodiment of the present application.

FIG. 3A illustrates an exemplary mapping table 300, in accordance with the prior art. Conventionally, mapping table 300 can be a look-up table stored in the DRAM to achieve a short query latency. Mapping table 300 can include a depth 320 which is a total number of PBAs corresponding to LBAs of data stored at the PBAs (e.g., PBAs 301-312) in the physical storage media. Mapping table 300 can also include a width 322.

In contrast, FIG. 3B illustrates an exemplary mapping table 330, with a reduced size and query latency as compared to the mapping table of FIG. 3A, in accordance with an embodiment of the present application. Mapping table 330 can be "simplified" in comparison to mapping table 300. Rather than the depth being the number of PBAs corresponding to LBAs of data stored at the PBAs (as in mapping table 300), instead mapping table 330 can have a depth divided by N 340. N can be the number of PBAs associated with the same NPA. That is, each NAND page address (NPA), such as NPAs 331, 332, and 333, can correspond to N LBAs, which can decrease the depth of the table to the original depth divided by N, and can also decrease a width 342 of the table to the original width-log 2N. For example, when N=4, the depth of mapping table 330 is reduced to one quarter of the original mapping table 300, while the width of mapping table 330 is shortened by 2 bits.

Thus, by using the NPA-based mapping table, the embodiments described herein can significantly reduce the usage of memory required for maintaining the mapping table. An FTL (or other) module can maintain mapping table 330 in a volatile cache (such as DRAM) and/or in a persistent media (such as NAND flash).

Using Stream Buffers to Facilitate Data Placement in a Multi-Tenant Storage System In addition to using the simplified mapping table of FIG. 3B, the embodiments described herein can also use stream buffers to reduce the latency and write amplification in a multi-tenant storage system. The stream buffers can be data buffers which are stored in a power loss-protected DRAM, as described below in relation to FIG. 5.

Based on the ever-increasing density of NAND flash, the parallelism of programming NAND flash also continues to increase. A single channel selection can control multiple NAND dies (e.g., three NAND dies), and each NAND die can include multiple planes (e.g., two or four). Thus, selecting a single channel can enable three NAND dies with six total planes. This allows for six NAND physical pages to be programmed together at the same time via one channel. For example, given a NAND physical page of a size of 16 KB, this allows the described system to accumulate 24 LBAs of 4 KB size before programming the NAND physical page. There is a high likelihood that consecutive LBAs from a same chunk's logical extent can be merged into the NAND page size (e.g., 16 KB). When a single 4 KB I/O enters the data buffer of the storage device, the system can commit that single 4 KB I/O as a success to the corresponding application (e.g., generate an acknowledgment or a notification of a write commit).

Subsequently, the system can asynchronously program or write that single 4 KB I/O from the power-loss protected data buffer to the NAND flash. As long as the data buffer has sufficient capacity protected by charge-backed capacitors, the system can accumulate the small I/Os as described below in relation to FIG. 4.

FIG. 4A illustrates an exemplary environment 400 which facilitates data placement, including mixed I/O data, in accordance with the prior art. Environment 400 can include incoming I/O 410, which includes: data 412 depicted as sectors A, <other>, B, A; data 414, depicted as sectors D, <other>, C, A; data 416 (depicted as A, A, B, A); data 418, depicted as sectors B, C, C, A; data 420, depicted as sectors C, E, B, A; and data 422, depicted as sectors D, <other>, <other>. The "A," "B," . . . can indicate a chunk identifier, an application identifier, or other identifier which marks a sector as corresponding to a specific application, chunk, user, or tenant.

The prior art system of environment 100 can include three NAND dies 430, 436, and 442, and at least two planes per die (e.g., planes 432 and 434 of NAND die 430; planes 438 and 440 of NAND die 436; and planes 444 and 446 of NAND die 442). During operation, the prior art system of environment 400 places the "mixed" data into the various planes of the NAND dies. For example: data 412 is placed into plane 446 of NAND die 442; data 414 is placed into plane 444 of NAND die 442; data 416 is placed into plane 440 of NAND die 436; data 418 is placed into plane 438 of NAND die 436; data 420 is placed into plane 434 of NAND die 430; and data 422 is placed into plane 432 of NAND die 430.

The data placement of FIG. 4A shows how physical pages, block, or other physical units in the physical storage media (i.e., in the planes of the NAND dies) include "mixed" data, which can subsequently result in many "holes" and an increased write amplification due to recycling so much valid data from blocks to be recycled. This is because data from different applications may be updated and recycled or accessed at around the same time, as described above in relation to FIG. 1.

FIG. 4B illustrates an exemplary environment 450 which facilitates data placement, including stream buffers 452 which reshuffle and hold data from a same chunk or application, and writing the reshuffled data to the non-volatile memory, in accordance with an embodiment of the present application. Environment 450 can include three NAND dies 470, 476, and 482, and at least two planes per die (e.g., planes 472 and 474 of NAND die 470; planes 478 and 480 of NAND die 476; and planes 484 and 486 of NAND die 482). In environment 450, incoming I/O 410 is accumulated, reshuffled, and held in stream buffers 452 before being written to the NAND flash. Each stream buffer can be associated with or correspond to an application or a chunk. Environment 450 depicts a snapshot of the incoming I/O held as sectors in the stream buffers and the eventual placement (e.g., writing) of those sectors in NAND dies 470, 476, and 482. For example, given incoming I/O 410 (via a communication 462), snapshot 450 indicates that the system has accumulated and reshuffled the data based on its corresponding application (e.g., indicated as A, B, C, D, or E). The system holds similarly identified sectors in a same buffer until the size of the held (or stored sectors) is the same as the size of a NAND physical page (or other granularity of the physical storage media). When the system detects that the size of the held sectors in a given buffer is the same as a physical page size, the system writes the data from the given buffer to a plane of the NAND die.

For example, when the system determines that four 4 KB C's are stored in a buffer (not shown), the system writes those four C's to plane 474 of NAND die 470. Similarly, when the system determines that four 4 KB A's are stored in a buffer (not shown), the system writes those four A's to plane 478 of NAND die 476. The snapshot depicted in environment 450 also shows that two D's are held in a stream buffer 454, four A's are held in a stream buffer 456, two E's are held in a stream buffer 458, and four B's are held in a stream buffer 460.

Figure 4C:
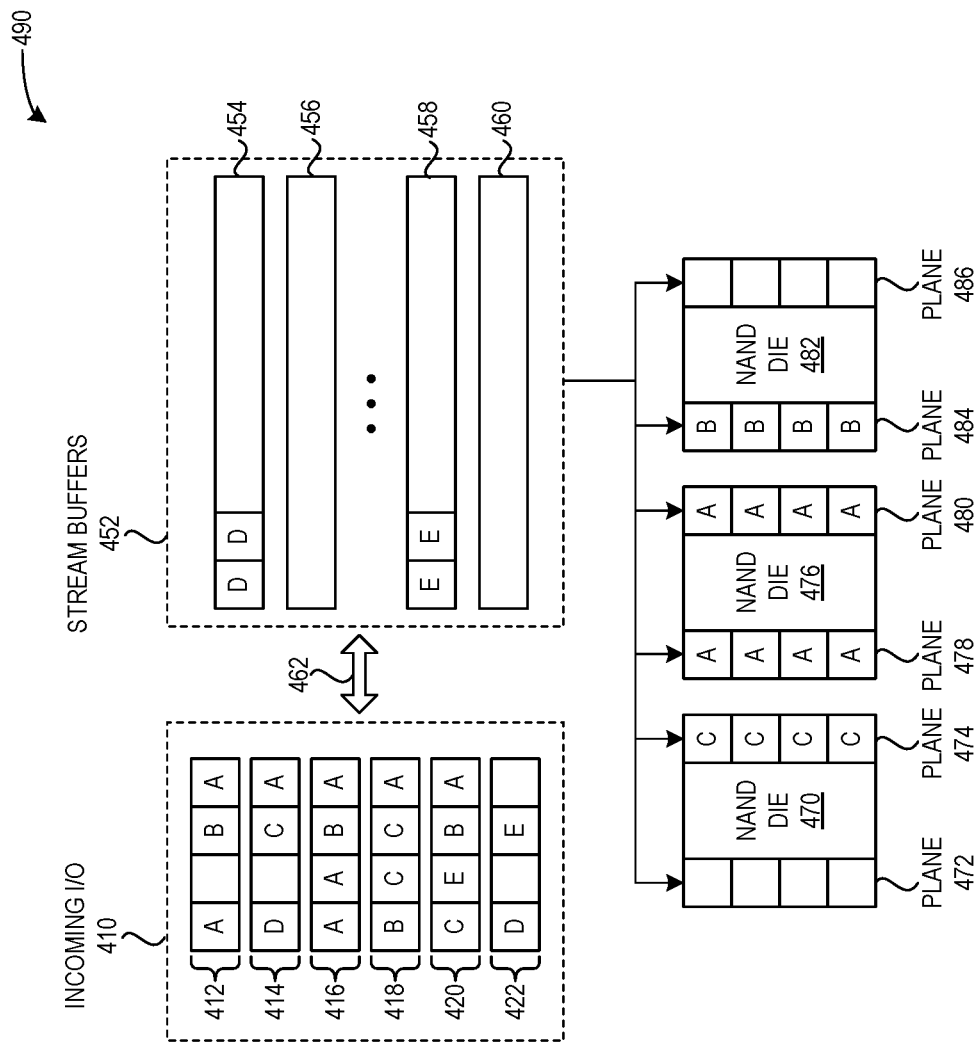
FIG. 4C illustrates the exemplary environment of FIG. 4B at a subsequent time, in accordance with an embodiment of the present application.

FIG. 4C illustrates an exemplary environment 490 corresponding to FIG. 4B at a subsequent time, in accordance with an embodiment of the present application. Environment 490 can depict a snapshot at a time subsequent to the snapshot depicted in environment 450. That is, the system determines that four A's are stored in stream buffer 456, and detects that a total size of those four stored A sectors are the same as the size of a physical NAND page. The system then writes those four stored A sectors to the NAND (at a plane 480 of NAND die 476), filling an entire physical NAND page at a first physical page address. The system can also create, in the mapping table, an entry which maps the LBAs of the written sectors to the first physical page address. The system can also mark as available the space in stream buffer 456 previously occupied by the four A sectors.

Similarly, the system determines (from FIG. 4B) that four B's are stored in stream buffer 460, and detects that a total size of those four stored B sectors are the same as the size of a physical NAND page. The system then writes those four stored B sectors to the NAND (at a plane 484 of NAND die 482), filling an entire physical NAND page at a second physical page address. The system can also create, in the mapping table, an entry which maps the LBAs of the written sectors to the second physical page address. The system can also mark as available the space in stream buffer 460 previously occupied by the four B sectors.

Stream buffer 454 (which holds two sectors of D) and stream buffer 458 (which holds two sectors of E) are currently open or waiting for other similarly identified sectors to form a full NAND physical page. That is, stream buffer 454 is waiting for two more sectors of D, while stream buffer 458 is waiting for two more sectors of E before writing the consequently formed pages of data to the NAND flash.

Once a sector has been written to a stream buffer, the system can generate an acknowledgment of a successful write for a corresponding application. The application can subsequently use the LBA to read and obtain the 4 KB data (e.g., to execute a read request). The system can search the mapping table based on the most significant bits (MSBs) to locate the 16 KB NPA. The NPA points to the physical NAND page with the four LBAs, and the system can subsequently use the two least significant bits (LSBs) to select which 4 KB portion is to be retrieved from or sent out from the NAND flash die. For example, once the correct mapping table entry is located, the system can identify: the first 4 KB sector with LBA LSBs of "00; the second 4 KB sector with LBA LSBs of "01"; the third 4 KB sector with LBA LSBs of "10"; and the fourth 4 KB sector with LBA LSBs of "11," e.g., as indicated by logical NAND page 230 (with LPAs and LSBs in FIG. 3B).

Figure 5:
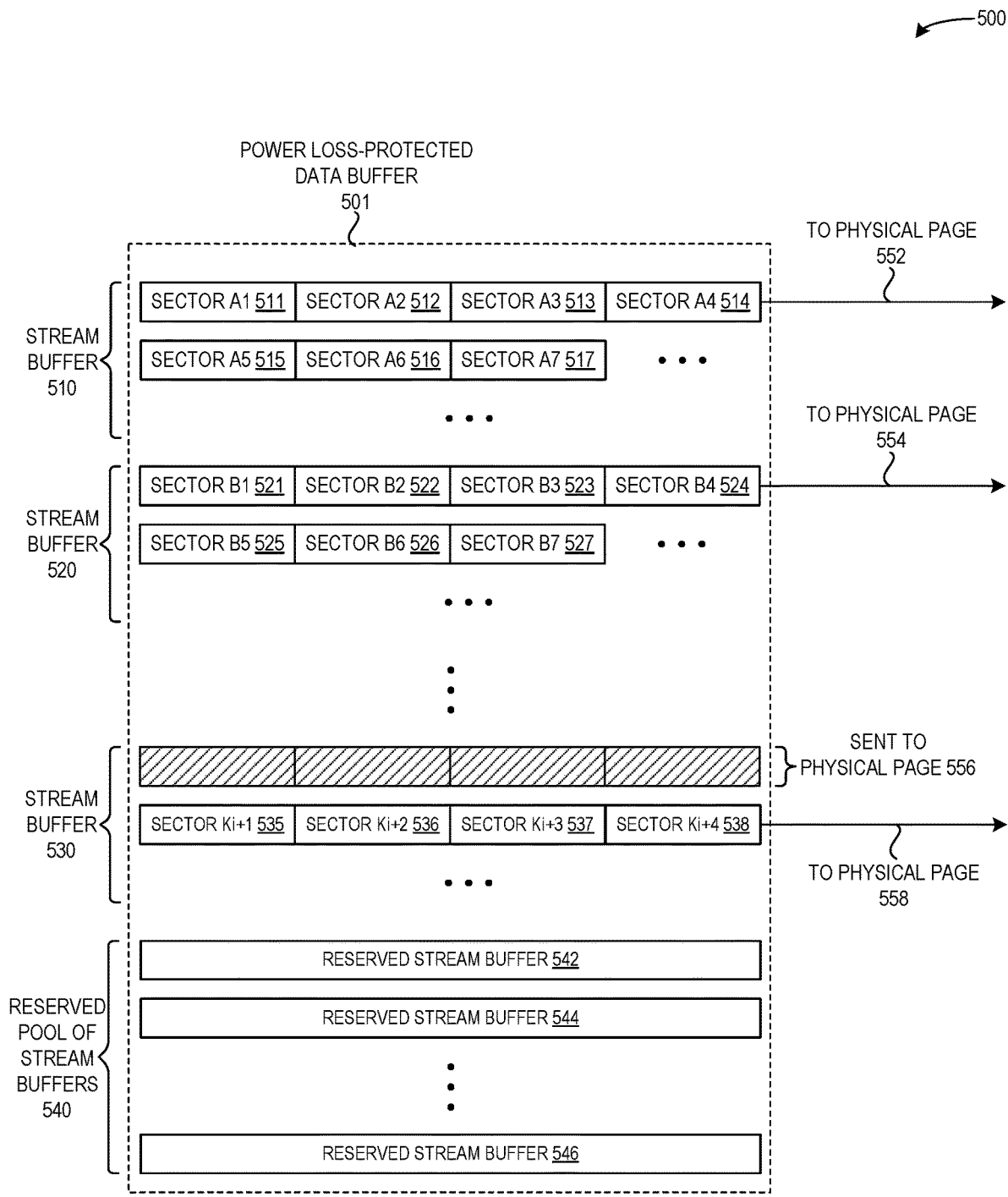
FIG. 5 illustrates an exemplary organization and management of stream buffers, in accordance with an embodiment of the present application.

FIG. 5 illustrates an exemplary organization 500 and management of stream buffers, in accordance with an embodiment of the present application. Organization 500 can include a power loss-protected data buffer 501, which includes a plurality of stream buffers. Some stream buffers are currently being used (e.g., 510, 520, and 530), while other stream buffers are part of a reserved pool of stream buffers 540 (e.g., 542, 544, and 546). The system can allocate stream buffers to temporarily hold the sectors from the various chunks, and can maintain a reserved pool of stream buffers to avoid running out of memory while handling extremely dynamic resource competition. When a NAND page worth of data is accumulated in a stream buffer, the system can send the accumulated data to the page buffer of a NAND plane to be programmed into the NAND flash.

For example, in stream buffer 510, sectors A1 511, A2 512, A3 513, and A4 514 are accumulated to form a full NAND page, and are thus sent to a physical page (via a communication 552). Also in stream buffer 510, sectors A5 515, A6 516, and A7 517 are waiting for one more sector to form a full page.

Similarly, in stream buffer 520, sectors B1 521, B2 522, B3 523, and B4 524 are accumulated to form a full NAND page, and are thus sent to a physical page (via a communication 554). Also in stream buffer 520, sectors B5 525, B6 526, and B7 527 are waiting for one more sector to form a full page.

Additionally, in stream buffer 530, four sectors (depicted with right-slanting diagonal lines) have already been sent to a physical page (via a communication 556). Also in stream buffer 530, sectors Ki+1 535, Ki+2 536, Ki+3 537, and Ki+4 538 are accumulated to form a full NAND page, and are thus sent to a physical page (via a communication 558).

Because each stream buffer only holds sectors from the logical extent of a given chunk, when the capacity of a given stream buffer approaches a limit, the system must recycle the given stream buffer. If the system experiences a power loss, the system must also recycle the open stream buffers. To recycle a stream buffer, the system can fill an open stream buffer with a prefixed or predetermined data pattern (e.g., dummy data), and can subsequently program the content as an entire NAND page. The mechanism of allocating and recycling stream buffers is described below in relation to FIGS. 6A, 6B, and 6C.

Figure 6A:
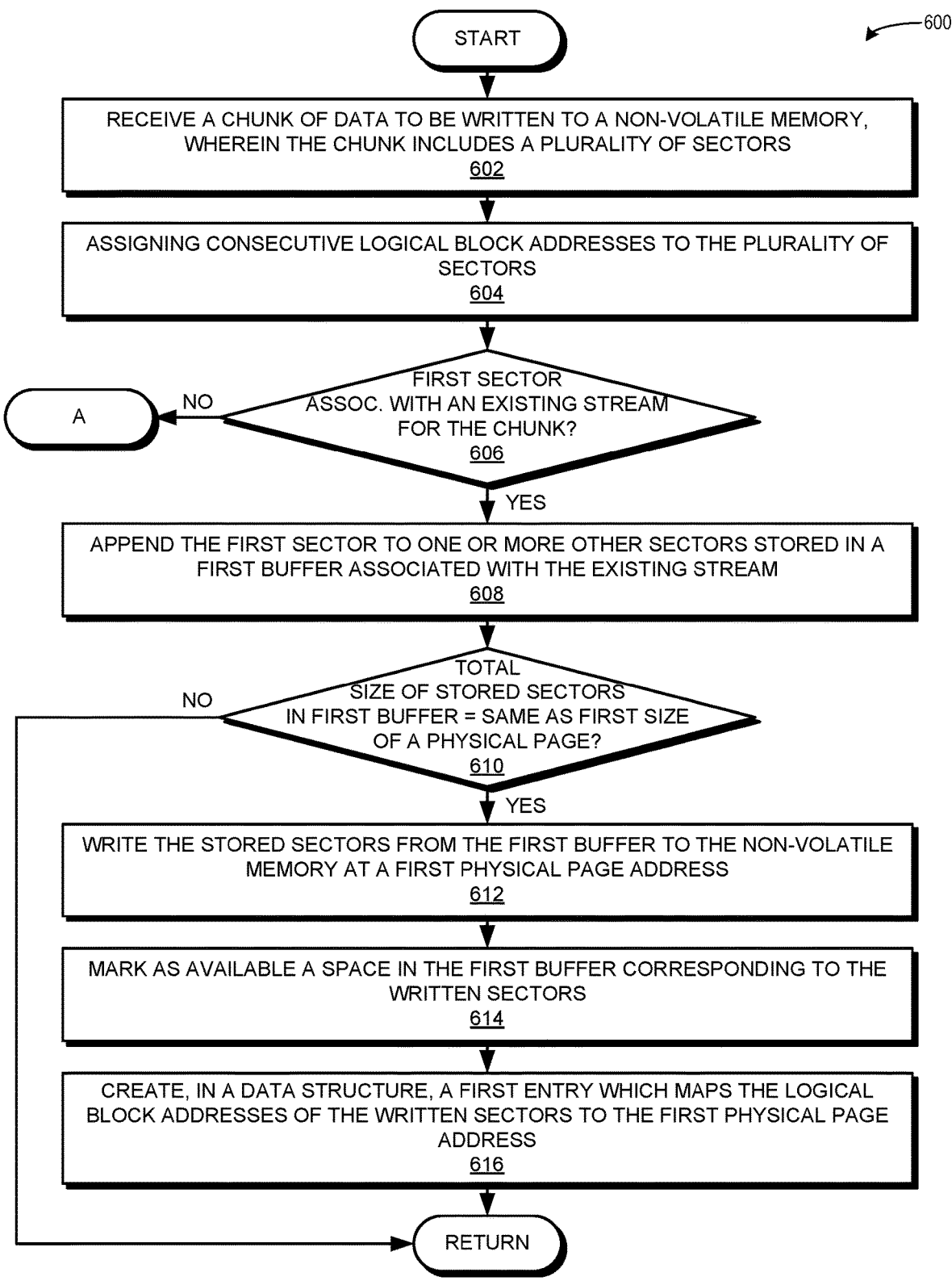
FIG. 6A presents a flowchart illustrating a method for facilitating data placement in a multi-tenant storage system, in accordance with an embodiment of the present application.

Exemplary Methods for Facilitating Data Placement in a Multi-Tenant Storage System FIG. 6A presents a flowchart 600 illustrating a method for facilitating data placement in a multi-tenant storage system, in accordance with an embodiment of the present application. During operation, the system receives a chunk of data to be written to a non-volatile memory, wherein the chunk includes a plurality of sectors (operation 602). The chunk comprises a plurality of logical extents and is associated with a unique application; a respective logical extent comprises a plurality of logical pages; and a respective logical page comprises one or more sectors with consecutive logical block addresses (LBAs). An LBA corresponds to a sector of the chunk.

The system assigns consecutive logical block addresses to the plurality of sectors (operation 604). If the first sector is not associated with an existing stream for the chunk (decision 606), the operation continues at Label A of FIG. 6B (i.e., new stream).

If the first sector is associated with an existing stream for the chunk (decision 606), the system appends the first sector to one or more other sectors stored in a first buffer associated with the existing stream (operation 608). In response to appending the first sector to one or more other sectors stored in the first buffer, the system generates an acknowledgment of a write commit for an application from which the chunk of data is received (not shown). If the system detects that a total size of the stored sectors in the first buffer is not the same as a first size of a physical page in the non-volatile memory (decision 610), the operation returns. In some embodiments, the operation checks to see if any other sectors remain to be written, and the operation may return to decision 606. Otherwise, if no more sectors remain to be written, the operation returns.

If the system detects that a total size of the stored sectors in the first buffer is the same as a first size of a physical page in the non-volatile memory (decision 610), the system writes the stored sectors from the first buffer to the non-volatile memory at a first physical page address (operation 612). The system marks as available a space in the first buffer corresponding to the written sectors (operation 614). The system creates, in a data structure, a first entry which maps the logical block addresses of the written sectors to the first physical page address (operation 616), and the operation returns.

Figure 6B:
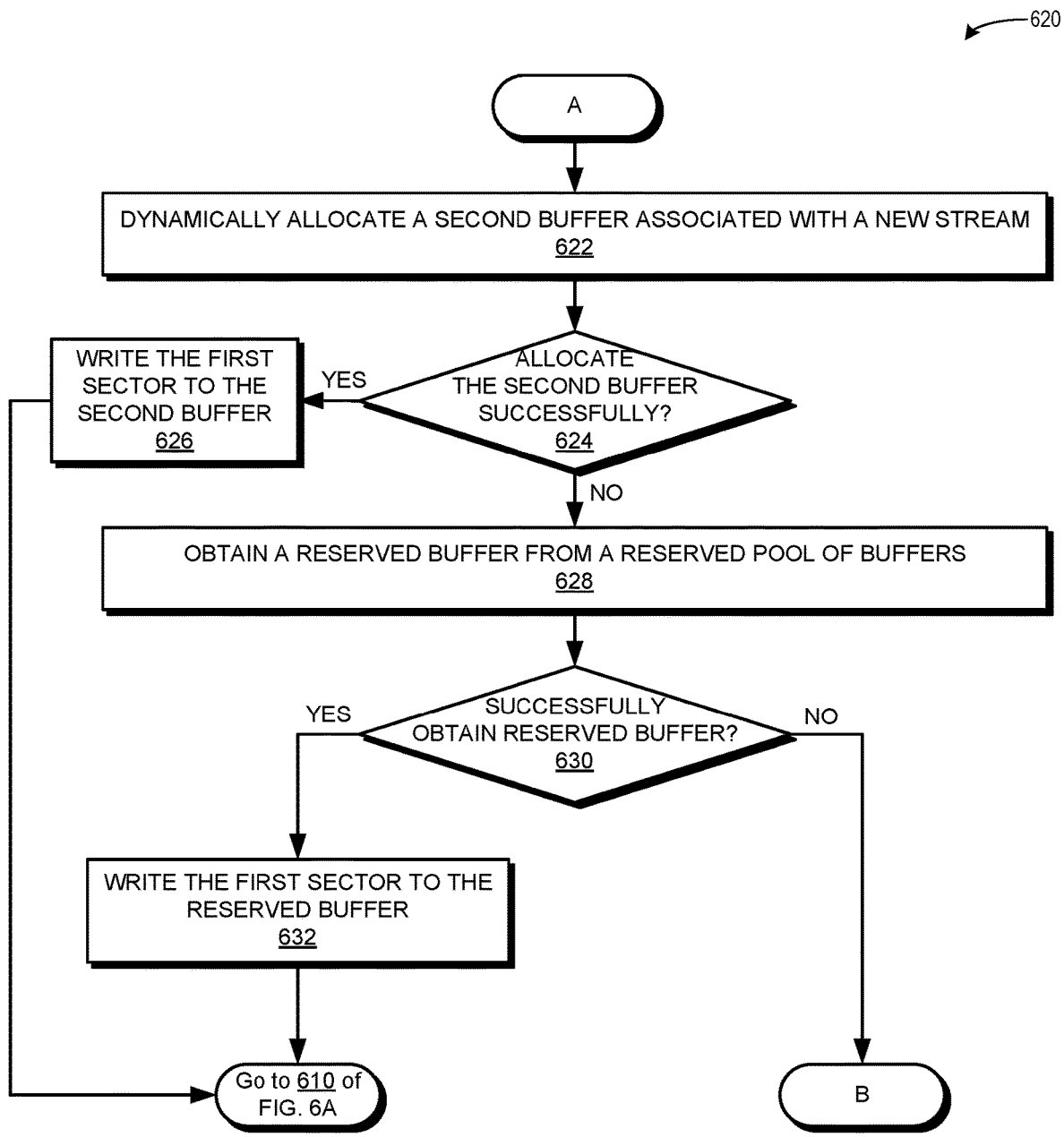
FIG. 6B presents a flowchart illustrating a method for facilitating data placement in a multi-tenant storage system, in accordance with an embodiment of the present application.

FIG. 6B presents a flowchart 620 illustrating a method for facilitating data placement in a multi-tenant storage system, in accordance with an embodiment of the present application. During operation, in response to decision 606, the system dynamically allocates a second buffer associated with a new stream (operation 622). If the system allocates the second buffer successfully (decision 624), the system writes the first sector to the second buffer (operation 626), and the operation continues at operation 610 of FIG. 6A (e.g., by applying operations 610, 612, 614, and 616 to the size of the stored sectors in the second buffer).

If the system does not allocate the second buffer successfully (decision 624), the system obtains a reserved buffer from a reserved pool of buffers (operation 628). If the system successfully obtains a reserved buffer (i.e., the reserved pool is not used up) (decision 630), the system writes the first sector to the reserved buffer (operation 632), and the operation continues at operation 610 of FIG. 6A (e.g., by applying operations 610, 612, 614, and 616 to the size of the stored sectors in the reserved buffer). If the system does not successfully obtain the reserved buffer (i.e., the reserved pool is used up) (decision 630), the operation continues at Label B of FIG. 6C.

Figure 6C:
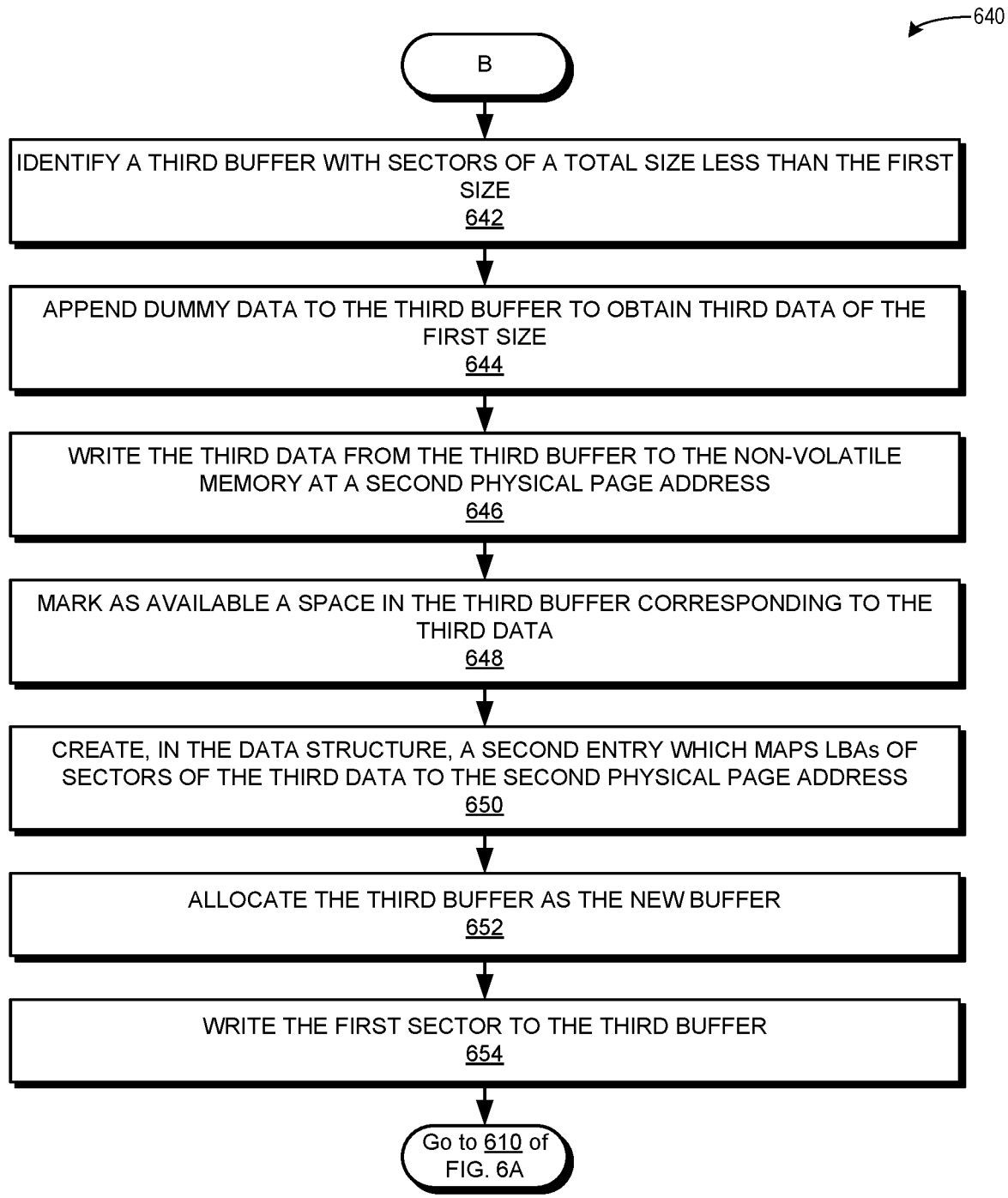
FIG. 6C presents a flowchart illustrating a method for facilitating data placement in a multi-tenant storage system, in accordance with an embodiment of the present application.

FIG. 6C presents a flowchart 640 illustrating a method for facilitating data placement in a multi-tenant storage system, in accordance with an embodiment of the present application. During operation, the system identifies a third buffer with sectors of a total size less than the first size (operation 642). The system appends dummy data to the third buffer to obtain third data of the first size (operation 644). The system writes the third data from the third buffer to the non-volatile memory at a second physical page address (operation 646). The system marks as available a space in the third buffer corresponding to the third data (operation 648). The system creates, in the data structure, a second entry which maps logical block addresses of sectors of the third data to the second physical page address (operation 650). The system allocates the third buffer as the new buffer (operation 652). The system writes the first sector to the third buffer (operation 654). The operation continues at operation 610 of FIG. 6A (e.g., by applying operations 610, 612, 614, and 616 to the size of the stored sectors in the third buffer).

Exemplary Computer System

Figure 7:
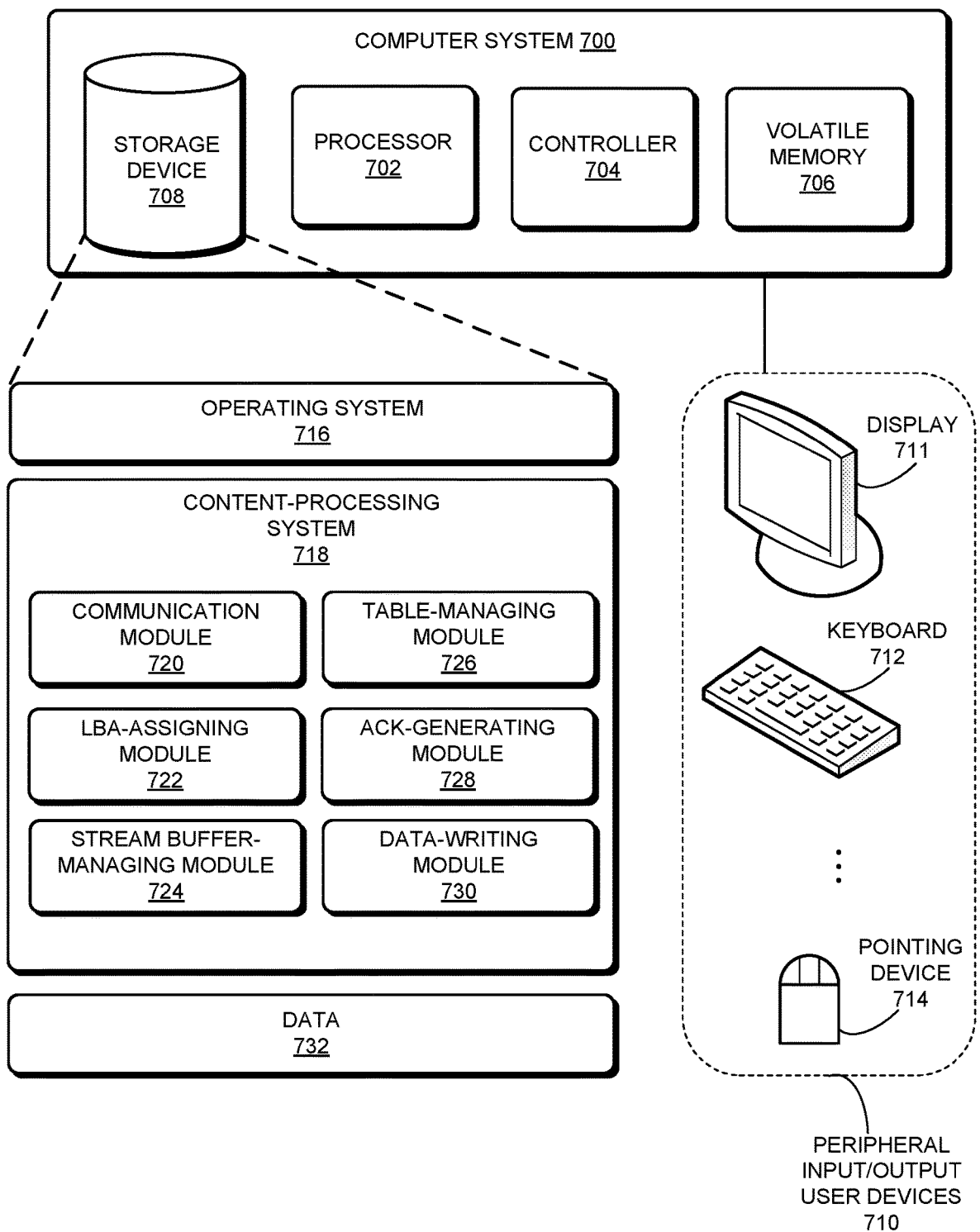
FIG. 7 illustrates an exemplary computer system that facilitates data placement, in accordance with an embodiment of the present application.

FIG. 7 illustrates an exemplary computer system 700 that facilitates data placement, in accordance with an embodiment of the present application. Computer system 700 includes a processor 702, a controller 704, a volatile memory 706, and a storage device 708. Volatile memory 706 can include, e.g., random access memory (RAM), that serves as a managed memory, and can be used to store one or more memory pools. Computer system 700 can be coupled to peripheral input/output (I/O) user devices 710, e.g., a display device 711, a keyboard 712, and a pointing device 714. Storage device 708 can store an operating system 716, a content-processing system 718, and data 732. Computer system 700 can communicate with multiple hosts or applications, and can also receive data to be stored in a non-volatile memory (such as storage device 708 or another storage media). Computer system 700 can also maintain a power loss-protected DRAM which includes multiple stream buffers and a reserved pool of stream buffers (such as in volatile memory 706 or a volatile cache of a storage device).

Content-processing system 718 can include instructions, which when executed by computer system 700, can cause computer system 700 to perform methods and/or processes described in this disclosure. Specifically, content-processing system 718 can include instructions for receiving and transmitting data packets, including data to be read or written, an input/output (I/O) request (e.g., a read request or a write request), a sector, a logical block address, a physical block address, an acknowledgment, and a notification.

Content-processing system 718 can include instructions for receiving a chunk of data to be written to a non-volatile memory, wherein the chunk includes a plurality of sectors (communication module 720). Content-processing system 718 can include instructions for assigning consecutive logical block addresses to the plurality of sectors (LBA-assigning module 722). Content-processing system 718 can include instructions for, in response to determining that a first sector is associated with an existing stream for the chunk (stream buffer-managing module 724), appending the first sector to one or more other sectors stored in a first buffer associated with the existing stream (data-writing module 730). Content-processing system 718 can include instructions for marking as available a space in the first buffer corresponding to the written sectors (stream buffer-managing module 724).

Content-processing system 718 can include instructions for detecting that a total size of the stored sectors in the first buffer is the same as a first size of a physical page in the non-volatile memory (stream buffer-managing module 724). Content-processing system 718 can include instructions for writing the stored sectors from the first buffer to the non-volatile memory at a first physical page address (data-writing module 730). Content-processing system 718 can include instructions for creating, in a data structure, a first entry which maps the logical block addresses of the written sectors to the first physical page address (table-managing module 726).

Content-processing system 718 can include instructions for, in response to appending the first sector to one or more other sectors stored in the first buffer (data-writing module 730), generating an acknowledgment of a write commit for an application from which the chunk of data is received (acknowledgment-generating module 728).

Content-processing system 718 can include instructions for allocating a second buffer associated with a new stream (stream buffer-managing module 724). Content-processing system 718 can include instructions for obtaining a reserved buffer from a reserved pool of buffers (stream buffer-managing module 724).

Data 732 can include any data that is required as input or generated as output by the methods and/or processes described in this disclosure. Specifically, data 732 can store at least: data; a chunk of data; a logical extent of data; a sector of data; a corresponding LBA; a logical page; a PBA; a physical page address (PPA); a NAND physical page address (NPA); a mapping table; an FTL module; an FTL mapping table; an entry; an entry mapping LBAs to an NPA; a request; a read request; a write request; an input/output (I/O) request; data associated with a read request, a write request, or an I/O request; an indicator or marking that a space in a buffer is available to be written to; an acknowledgment or notification of a write commit; a size; a logical page size; a size of a plurality of sectors; a physical page size; a NAND physical page size; a size of a physical granularity in a storage media; a stream buffer; a reserved buffer; a pool of reserved buffers; a most significant bit (MSB); and a least significant bit (LSB).

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
   receiving a mixed input/output (I/O) request comprising a plurality of chunks of data to be written to a non-volatile memory, wherein a respective chunk includes a plurality of sectors which are indicated as corresponding to the respective chunk, and wherein the plurality of sectors are assigned with consecutive logical block addresses;
   reshuffling sectors of the plurality of chunks of the mixed I/O request by:
      responsive to determining that a first sector of a first chunk is associated with an existing stream for the first chunk, appending the first sector to one or more other sectors stored in a first buffer of a power-loss protected volatile memory, wherein the first buffer is associated with the existing stream;
      responsive to determining that a second sector is not associated with an existing stream for the first chunk and responsive to successfully allocating a second buffer associated with a new stream, writing the second sector to the second buffer; and
      responsive to determining that a second sector is not associated with an existing stream for the first chunk and responsive to unsuccessfully allocating the second buffer associated with a new stream, obtaining a reserved buffer from a reserved pool of buffers and writing the second sector to the reserved buffer;
   accumulating the reshuffled sectors in at least one of the first buffer, the second buffer, and the reserved buffer until a total size of stored sectors in the at least one of the first buffer, the second buffer, and the reserved buffer is the same as a first size of a physical page in the non-volatile memory;
   responsive to detecting that the total size of the accumulated reshuffled sectors in the at least one of the first buffer, the second buffer, and the reserved buffer is the same as a first size of a physical page in the non-volatile memory, writing the accumulated reshuffled sectors as a first set of sectors from the at least one of the first buffer, the second buffer, and the reserved buffer to the non-volatile memory at a first physical page address, wherein the first set of sectors are assigned with a first set of consecutive logical block addresses;
   creating, in a data structure, a first entry which maps each logical block address of the first set of consecutive logical block addresses to the same first physical page address,
   wherein an entry in the data structure includes only a single physical page address mapped to multiple logical block addresses, and wherein two least significant bits of each logical block address are used to subsequently retrieve data stored at the physical page address; and
   executing a read request based on a respective logical block address mapped in the first entry, by:
      searching the data structure based on most significant bits of the respective LBA to obtain the first physical page address; and
      retrieving data stored at the first physical page address based on only two least significant bits of the respective logical block address.

2. The method of claim 1, further comprising:
   marking as available a space in the first buffer corresponding to the written sectors.

3. The method of claim 1, wherein in response to appending the first sector of the first chunk to one or more other sectors stored in the first buffer, the method further comprises:
   generating an acknowledgment of a write commit for an application from which the first chunk of data is received.

4. The method of claim 1, wherein in response to determining that the second sector is not associated with the existing stream for the first chunk, unsuccessfully allocating the second buffer, and unsuccessfully obtaining the reserved buffer from the reserved pool of buffers, the method further comprises:
   identifying a third buffer with sectors of a total size less than the first size;
   appending dummy data to the third buffer to obtain third data of the first size;
   writing the third data from the third buffer to the non-volatile memory at a second physical page address;
   marking as available a space in the third buffer corresponding to the third data;
   creating, in the data structure, a second entry which maps logical block addresses of sectors of the third data to the second physical page address;
   allocating the third buffer as the new buffer; and
   writing the second sector to the third buffer.

5. The method of claim 1,
   wherein a respective chunk comprises a plurality of logical extents and is associated with a unique application,
   wherein a respective logical extent comprises a plurality of logical pages,
   wherein a respective logical page comprises one or more sectors with consecutive logical block addresses, and wherein a logical block address corresponds to a sector of the respective chunk.

6. The method of claim 5,
wherein the non-volatile memory comprises a NAND-based flash memory,
wherein the respective logical page is a NAND logical page, and
wherein the first physical page address corresponds to a NAND physical page.

7. The method of claim 1,
wherein the data structure is stored in the volatile cache and the non-volatile memory, and
wherein the first entry indicates the logical addresses of the written sectors based on the two least significant bits.

8. The method of claim 1,
wherein a depth of the data structure is reduced in size from a traditional mapping table in which a traditional depth comprises a total number of physical block addresses corresponding to logical block addresses of data stored at the physical block addresses,
wherein the depth of the data structure is scaled by a fraction based on a first number of physical block addresses associated with a same NAND page address, and
wherein each NAND page address corresponds to the first number of logical block addresses, which comprises a reduction in size from the traditional mapping table to the traditional depth divided by the first number.

9. The method of claim 8,
wherein a width of the data structure is reduced in size by two bits from a traditional width of the traditional mapping table.

10. An apparatus, comprising:
a controller; a volatile memory; and a non-volatile memory, wherein the controller stores instructions to:
receive a mixed input/output (I/O) request comprising a plurality of chunks of data to be written to a non-volatile memory, wherein a respective chunk includes a plurality of sectors which are indicated as corresponding to the respective chunk and wherein consecutive logical block addresses are assigned to the plurality of sectors;
reshuffle sectors of the plurality of chunks of the mixed I/O request by:
responsive to determining that a first sector of a first chunk is associated with an existing stream for the first chunk, appending the first sector to one or more other sectors stored in a first buffer of a power-loss protected volatile memory, wherein the first buffer is associated with the existing stream;
responsive to determining that a second sector is not associated with an existing stream for the first chunk and responsive to successfully allocating a second buffer associated with a new stream, writing the second sector to the second buffer; and
responsive to determining that a second sector is not associated with an existing stream for the first chunk and responsive to unsuccessfully allocating the second buffer associated with a new stream, obtaining a reserved buffer from a reserved pool of buffers and writing the second sector to the reserved buffer;
accumulate the reshuffled sectors in at least one of the first buffer, the second buffer, and the reserved buffer until a total size of stored sectors in the at least one of the first buffer, the second buffer, and the reserved buffer is the same as a first size of a physical page in the non-volatile memory;
responsive to detecting that the total size of the accumulated reshuffled sectors in the at least one of the first buffer, the second buffer, and the reserved buffer is the same as a first size of a physical page in the non-volatile memory, write the accumulated reshuffled sectors as a first set of sectors from the at least one of the first buffer, the second buffer, and the reserved buffer to the non-volatile memory at a first physical page address, wherein the first set of sectors are assigned with a first set of consecutive logical block addresses;
create, in a data structure, a first entry which maps each logical block address of the first set of consecutive logical block addresses to the same first physical page address,
wherein an entry in the data structure includes only a single physical page address mapped to multiple logical block addresses, and wherein two least significant bits of each logical block address are used to subsequently retrieve data stored at the physical page address; and
executing a read request based on a respective logical block address mapped in the first entry, by:
searching the data structure based on most significant bits of the respective LBA to obtain the first physical page address; and
retrieving data stored at the first physical page address based on only two least significant bits of the respective logical block address.

11. The apparatus of claim 10, wherein the controller stores instructions further to:
in response to appending the first sector of the first chunk to one or more other sectors stored in the first buffer, generate an acknowledgment of a write commit for an application from which the first chunk of data is received.

12. The apparatus of claim 10, wherein the controller stores instructions further to, in response to determining that the second sector is not associated with the existing stream for the first chunk, unsuccessfully allocating the second buffer, and unsuccessfully obtaining the reserved buffer from the reserved pool of buffers:
identify a third buffer with sectors of a total size less than the first size;
append dummy data to the third buffer to obtain third data of the first size;
write the third data from the third buffer to the non-volatile memory at a second physical page address;
mark as available a space in the third buffer corresponding to the third data;
create, in the data structure, a second entry which maps logical block addresses of sectors of the third data to the second physical page address;
allocate the third buffer as the new buffer; and
write the second sector to the third buffer.

13. The apparatus of claim 10,
wherein a respective chunk comprises a plurality of logical extents and is associated with a unique application,
wherein a respective logical extent comprises a plurality of logical pages,
wherein a respective logical page comprises one or more sectors with consecutive logical block addresses,
wherein a logical block address corresponds to a sector of the respective chunk, wherein the non-volatile memory comprises a NAND-based flash memory,
wherein the respective logical page is a NAND logical page, and
wherein the first physical page address corresponds to a NAND physical page.

14. A computer system, comprising:
a processor; and
a memory coupled to the processor and storing instructions, which when executed by the processor cause the processor to perform a method, the method comprising:
receiving a mixed input/output (I/O) request comprising a plurality of chunks of data to be written to a non-volatile memory, wherein a respective chunk includes a plurality of sectors which are indicated as corresponding to the respective chunk and wherein the plurality of sectors are assigned with consecutive logical block addresses;
reshuffling sectors of the plurality of chunks of the mixed I/O request by:
    responsive to determining that a first sector of a first chunk is associated with an existing stream for the first chunk, appending the first sector to one or more other sectors stored in a first buffer of a power-loss protected volatile memory, wherein the first buffer is associated with the existing stream;
    responsive to determining that a second sector is not associated with an existing stream for the first chunk and responsive to successfully allocating a second buffer associated with a new stream, writing the second sector to the second buffer; and
    responsive to determining that a second sector is not associated with an existing stream for the first chunk and responsive to unsuccessfully allocating the second buffer associated with a new stream, obtaining a reserved buffer from a reserved pool of buffers and writing the second sector to the reserved buffer;
accumulating the reshuffled sectors in at least one of the first buffer, the second buffer, and the reserved buffer until a total size of stored sectors in the at least one of the first buffer, the second buffer, and the reserved buffer is the same as a first size of a physical page in the non-volatile memory;
responsive to detecting that the total size of the accumulated reshuffled sectors in the at least one of the first buffer, the second buffer, and the reserved buffer is the same as a first size of a physical page in the non-volatile memory, writing the accumulated reshuffled sectors as a first set of sectors from the at least one of the first buffer, the second buffer, and the reserved buffer to the non-volatile memory at a first physical page address, wherein the first set of sectors are assigned with a first set of consecutive logical block addresses;
creating, in a data structure, a first entry which maps each logical block address of the first set of consecutive logical block addresses to the same first physical page address;
wherein an entry in the data structure includes only a single physical page address mapped to multiple logical block addresses, and wherein two least significant bits of each logical block address are used to subsequently retrieve data stored at the physical page address; and
executing a read request based on a respective logical block address mapped in the first entry, by:
    searching the data structure based on most significant bits of the respective LBA to obtain the first physical page address; and
    retrieving data stored at the first physical page address based on only two least significant bits of the respective logical block address.

15. The computer system of claim 14, wherein the method further comprises:
marking as available a space in the first buffer corresponding to the written sectors.

16. The computer system of claim 14, wherein in response to appending the first sector of the first chunk to one or more other sectors stored in the first buffer, the method further comprises:
generating an acknowledgment of a write commit for an application from which the first chunk of data is received.

17. The computer system of claim 14, wherein in response to determining that the second sector is not associated with the existing stream for the first chunk, unsuccessfully allocating the second buffer, and unsuccessfully obtaining the reserved buffer from the reserved pool of buffers, the method further comprises:
identifying a third buffer with sectors of a total size less than the first size;
appending dummy data to the third buffer to obtain third data of the first size;
writing the third data from the third buffer to the non-volatile memory at a second physical page address;
marking as available a space in the third buffer corresponding to the third data;
creating, in the data structure, a second entry which maps logical block addresses of sectors of the third data to the second physical page address;
allocating the third buffer as the new buffer; and
writing the second sector to the third buffer.

18. The computer system of claim 14,
wherein a respective chunk comprises a plurality of logical extents and is associated with a unique application,
wherein a respective logical extent comprises a plurality of logical pages,
wherein a respective logical page comprises one or more sectors with consecutive logical block addresses,
wherein a logical block address corresponds to a sector of the respective chunk,
wherein the non-volatile memory comprises a NAND-based flash memory,
wherein the respective logical page is a NAND logical page, and
wherein the first physical page address corresponds to a NAND physical page.

19. The computer system of claim 14,
wherein the data structure is stored in the volatile cache and the non-volatile memory, and
wherein the first entry indicates the logical addresses of the written sectors based on the two least significant bits.

20. The computer system of claim 14,
wherein a depth of the data structure is reduced in size from a traditional mapping table in which a traditional depth comprises a total number of physical block addresses corresponding to logical block addresses of data stored at the physical block addresses,
wherein the depth of the data structure is scaled by a fraction based on a first number of physical block addresses associated with a same NAND page address,
wherein each NAND page address corresponds to the first number of logical block addresses, which comprises a reduction in size from the traditional mapping table to the traditional depth divided by the first number, and wherein a width of the data structure is reduced in size by two bits.

\* \* \* \* \*